United States Patent
Milton, Jr.

(10) Patent No.: US 7,890,851 B1
(45) Date of Patent: Feb. 15, 2011

(54) SYSTEM FOR FACILITATING THE PREPARATION OF A PATENT APPLICATION

(76) Inventor: Harold W. Milton, Jr., 211 Townsend, Birmingham, MI (US) 48009

(*) Notice: Subject to any disclaimer, the term of this patent is extended or adjusted under 35 U.S.C. 154(b) by 1277 days.

(21) Appl. No.: 09/273,021

(22) Filed: Mar. 19, 1999

(51) Int. Cl.
*G06F 17/00* (2006.01)
*G06Q 50/00* (2006.01)

(52) U.S. Cl. ...................... 715/224; 705/310

(58) Field of Classification Search ......... 715/522–523, 715/507, 530, 509, 517, 533, 537, 224, 227, 715/243, 248, 255, 266; 707/530, 522, 507, 707/2, 7, 102; 704/9; 705/310
See application file for complete search history.

(56) References Cited

U.S. PATENT DOCUMENTS

| | | | |
|---|---|---|---|
| 5,175,681 A * | 12/1992 | Iwai et al. ................ | 705/9 |
| 5,623,681 A * | 4/1997 | Rivette et al. ............. | 345/788 |
| 5,754,840 A * | 5/1998 | Rivette et al. ............. | 707/2 |
| 5,774,833 A * | 6/1998 | Newman .................... | 704/9 |
| 6,029,182 A * | 2/2000 | Nehab et al. .............. | 707/501.1 |
| 6,049,811 A * | 4/2000 | Petruzzi et al. ............ | 715/507 |
| 6,298,327 B1 * | 10/2001 | Hunter et al. ............. | 345/781 |

OTHER PUBLICATIONS

Manual of Patent Examining Procedure, 7th edition, published Jul. 1998, chapter 600.*

* cited by examiner

*Primary Examiner*—Laurie Ries

(57) ABSTRACT

A computer program and a computer for drafting a patent application including a template memory for storing and duplicating standard headings and paragraphs of a patent and which interacts with other memories and processors to provide a structure and process to follow in preparing a patent application. An independent claim processor (12) duplicates an independent claim under the heading SUMMARY OF THE INVENTION AND ADVANTAGES and edits same into a grammatically correct sentence structure. A multiple claim processor (14) duplicates all of the claims under the heading DESCRIPTION OF THE PREFERRED EMBODIMENT and edits same into grammatically correct sentence structure. A reference number processor (20) is responsive to a Figure number memory (18) for searching and adding reference numerals to the element names in the order of occurrence.

13 Claims, 1 Drawing Sheet

SYSTEM FOR FACILITATING THE PREPARATION OF A PATENT APPLICATION

BACKGROUND OF THE INVENTION

1. Field of the Invention

The subject invention relates to a computer system for preparing a patent application and, more particularly, to a computer program and computer to prepare a patent application which is acceptble to and conforms and facilitates the translation and filing in the various jurisdictions of the world.

2. Description of the Prior Art

There exists various word processing computer programs which are used to prepare patent applications. However, these programs are generic to various word processing tasks.

Time is a very important commodity in the prepartion of patent applications yet patent applications are very precise documents which require extreme accuracy and consistentcy of terminalogy.

Accorndingly, there is a need for a dedicated program and inherent system for efficiently and accurately prepaing a patent application.

SUMMARY OF THE INVENTION AND ADVANTAGES

A computer program and a computer including a template memory containing a document template containing headings equivalent to:

"BACKGROUND OF THE INVENTION

1) Field of the Invention

2) Description of the Prior Art

SUMMARY OF THE INVENTION AND ADVANTAGES

BRIEF DESCRIPTION OF THE DRAWINGS

DETAILED DESCRIPTION OF THE PREFERRED EMBODIMENT

CLAIMS

ABSTRACT OF THE DISCLOSURE"

Figure 1:
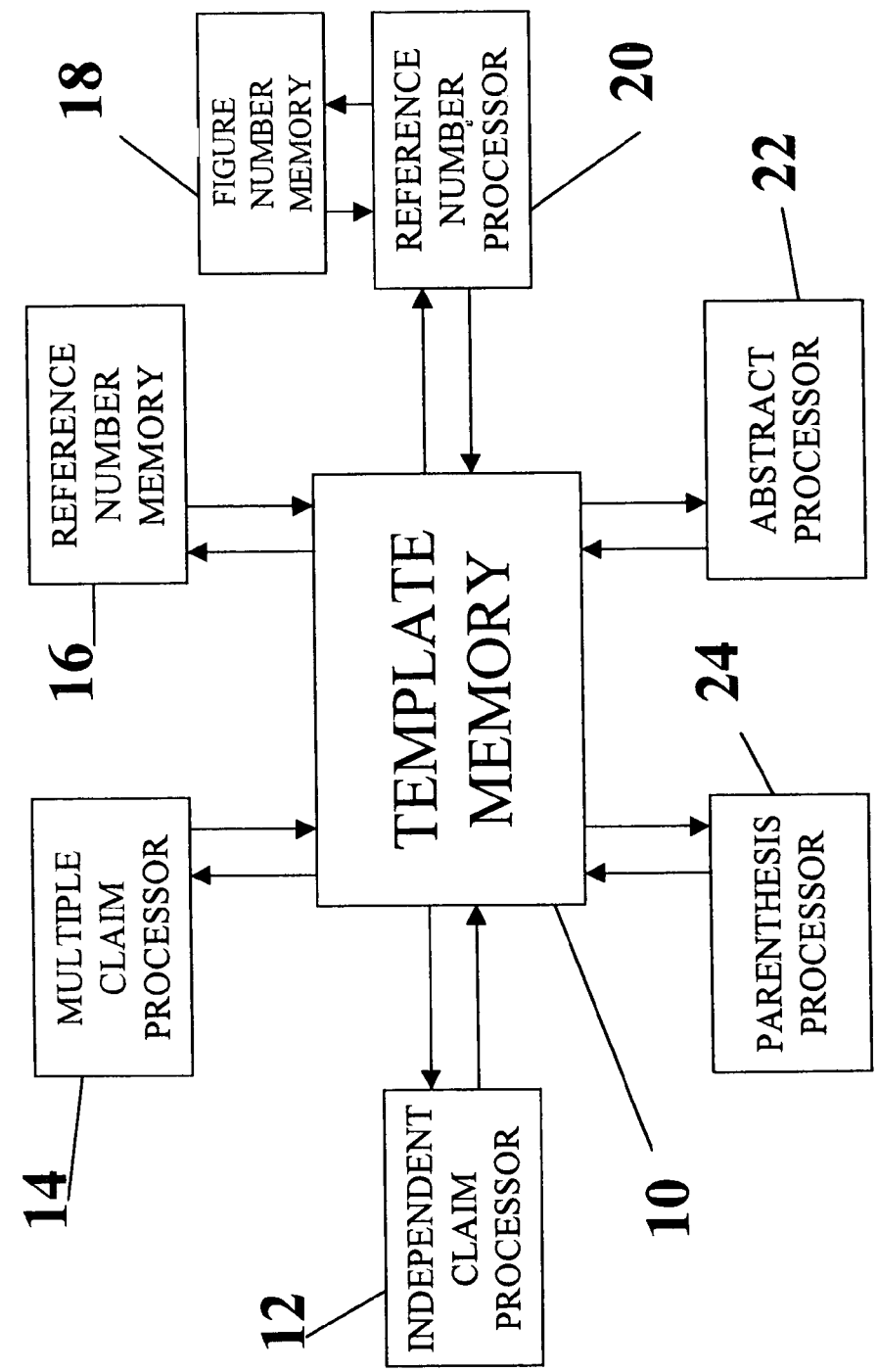

A page break is stored in the computer program immediately before the "CLAIMS" heading and another page break is stored in the computer program immediately before the "ABSTRACT OF THE DISCLOSURE" heading. Also included is a footer stored in the computer program for displaying the attorney file identification on every page of the application. A user composes an independent claim in the computer program ending in a clause beginning with the words "characterized by" and reciting and isolating the novelty. At least one clause reciting prior art elements precedes the "characterized by" clause to support and provide antecedent basis for the "characterized by" clause. The drafting of subsequent claims in the computer ultimately depends upon the independent claim for successively more specifically defining the patentable novelty.

The invention is characterized by storing a duplicate set of all of the claims in the computer program and creating the description by retrieving the duplicate set of claims under the heading "DESCRIPTION OF THE PREFERRED EMBODIMENT". The invention is further characterized by searching for each occurrence of the word "said" in the duplicate set of claims copied into the specification and programming the computer program to replace the word "said" with the word "the" in the duplicate set of claims whereby the duplicate set of claims is edited into grammatically correct sentence structure. The editing includes adding verbs and assigning reference numerals for element names by storing the element names of the elements in the order recited in the duplicate set of claims. Accordingly, successive numbers beginning with a number above the highest Figure number to identify the respective element names are stored in the computer program. The computer program then searches the duplicate set of claims for each occurrence of each respective element name in the order of occurrence and replaces each respective element name with that respective element name followed by the element number or numbers corresponding to that respective element name. Thus, the computer program automatically provides identifying reference numerals for the element names in the order of occurrence in the duplicate set of claims and automatically shifts the reference numerals in response to changing the order of occurrence in the duplicate set of claims.

Accordingly, the invention encompasses a method of preparing a patent application with a computer comprising the steps of: storing a document template in a computer program which contains headings set forth above, storing a page break immediately before the "CLAIMS" heading in the computer program, storing a page break immediately before the "ABSTRACT OF THE DISCLOSURE" heading in the computer program, storing a footer in the computer program for displaying the attorney file identification on every page of the application, composing an independent claim in the computer program ending in a clause beginning with the words "characterized by" and reciting and isolating the novelty and preceded by at least one clause reciting prior art elements to the extent necessary, drafting claims in the computer ultimately dependent upon the independent claim for successively more specifically defining the patentable novelty; and characterized by storing a duplicate set of all of the claims in the computer program to create the description by retrieving the duplicate set of claims under the heading "DESCRIPTION OF THE PREFERRED EMBODIMENT", searching for each occurrence of the word "said" in the duplicate set of claims copied into the specification, programming the computer program to replace the word "said" with the word "the" in the duplicate set of claims copied into the specification, editing the duplicate set of claims copied into the specification into grammatically correct sentence structure including adding verbs, assigning reference numerals for the first time by the steps of storing the element names of the elements in the order recited in the duplicate set of claims, storing successive numbers beginning with a number above the highest Figure number to identify the respective element names, searching for each occurrence of each respective element name in the order of occurrence in the duplicate set of claims, replacing each respective element name with that respective element name followed by successive ones of said numbers to provide identifying reference numerals for the element names in the order of occurrence in the duplicate set of claims, and automatically shifting the reference numerals in response to changing the order of occurrence in the duplicate set of claims.

BRIEF DESCRIPTION OF THE DRAWING

Other advantages of the present invention will be readily appreciated as the same becomes better understood by reference to the following detailed description when considered in connection with the accompanying drawings wherein FIG. 1 is a block diagram of the components of the subject invention.

DETAILED DESCRIPTION OF THE PREFERRED EMBODIMENT

Referring to the Figure, a computer program and a computer is illustrated as comprising a template memory 10 containing a document template containing the same heading this patent contains, to wit:

BACKGROUND OF THE INVENTION

1) Field of the Invention

2) Description of the Prior Art

SUMMARY OF THE INVENTION AND ADVANTAGES

BRIEF DESCRIPTION OF THE DRAWINGS

DETAILED DESCRIPTION OF THE PREFERRED EMBODIMENT

CLAIMS, and

ABSTRACT OF THE DISCLOSURE.

The template memory 10 also includes an imbedded page break immediately before said heading CLAIMS in the computer program. Accordingly, the heading CLAIMS and the following claims always begin a new page. In addition, a page break is embedded in template memory 10 for separating the heading ABSTRACT OF THE DISCLOSURE from the remainder of the headings in the computer program. In other words, the ABSTRACT is isolated to a single page separate from the remainder of the patent application. A footer is embedded in the template memory 10 for displaying the attorney file identification in the margin of every page of the application, preferably in the lower left hand corner so as to be unencumbered by attachments at the tops of the pages, e.g., staples, clasps, or the like.

The template memory 10 will also contain certain generic paragraphs such as the last two paragraphs of this specification immediately before said page break preceding the heading CLAIMS to make it clear that not every nuance of the invention can be covered in a patent application and that the invention is defined by the scope of the claims. In addition, immediately after the heading BRIEF DESCRIPTION OF THE DRAWINGS the template memory 10 will include another generic paragraph:

> Other advantages of the present invention will be readily appreciated as the same becomes better understood by reference to the following detailed description when considered in connection with the accompanying drawings wherein:
> 
> FIG. 1 is;
> FIG. 2 is;
> FIG. 3 is;
> FIG. 4 is; and
> FIG. 5 is.

The invention is characterized by an independent claim processor 12 for duplicating and storing an independent claim under the heading SUMMARY OF THE INVENTION AND ADVANTAGES and for editing the duplicated independent claim copied under the heading SUMMARY OF THE INVENTION AND ADVANTAGES is commensurate in scope to said independent claim. The independent claim processor 12 will code the space between the SUMMARY OF THE INVENTION AND ADVANTAGES and the next adjacent title BRIEF DESCRIPTION OF THE DRAWINGS to automatically replace the word "said" with—the—. The independent claim processor 12 will also automatically provide correct sentence structure, which, of course, can be manually changed by using a keyboard.

Also characterizing the invention is a multiple claim processor 14 for duplicating and storing all of the claims under the heading DESCRIPTION OF THE PREFERRED EMBODIMENT and for searching and replacing each occurrence of the word "said" in the duplicate set of claims copied under the heading DESCRIPTION OF THE PREFERRED EMBODIMENT with the word—the—, and for editing the duplicate set of claims into grammatically correct sentence structure. The multiple claim processor 14 will code the space under the heading DESCRIPTION OF THE PREFERRED EMBODIMENT to automatically replace the word "said" with—the—and to automatically correct sentence structure which can be manually changed.

Also included are a reference number memory 16 for storing successive even numerals beginning with the number ten and a Figure number memory 18 for receiving and storing the highest Figure number used to identify Figures of the drawings. A reference number processor 20 is responsive to the Figure number memory 18 for storing the element names of the elements in the order recited in the duplicate set of claims and for searching and replacing each occurrence of each respective element name in the order of occurrence in the duplicate set of claims with the respective element name followed by successive ones of the even numbers beginning with the first number ending in zero following the highest Figure number to provide identifying reference numerals for the element names in the order of occurrence in the duplicate set of claims. In other words, the highest number used to identify Figures of the drawings will be entered into the Figure number memory 18 and the reference number processor 20 stores numbers beginning with the number ten and will automatically begin assigning reference numerals to the elements beginning with the next number ending in zero above the highest number used to identify a Figure of the drawings. The reference number processor 20 will also build a list of elements with reference numerals and will automatically shift the reference numerals in the list of elements, which is in the order first recited in the description, in the event an additional element is interleaved in the description.

An abstract processor 22 is included for selecting and storing abstract sentences including said reference numerals from under said heading DESCRIPTION OF THE PREFERRED EMBODIMENT and duplicating the abstract sentences under the heading ABSTRACT OF THE DISCLOSURE. The operator will select certain sentences from the description in order of presentation and the abstract processor 22 will store such sentences for duplication and presentation under the heading ABSTRACT OF THE DISCLOSURE.

This presentation is of the disclosure for the benefit of those skilled in the art and searchers without the legalize of claim language and is most beneficial when specifically reciting the structure of the invention.

A parenthesis processor 24 is included for automatically enclosing each reference numeral within parentheses in the claims and in the ABSTRACT OF THE DISCLOSURE. In other words, the claims and the abstract are to be written in a form which is not dependent upon nor reliant upon the reference numerals for clarity or interpretation; the reference numerals are there for convenience and efficiency. An important attribute of including the reference numerals in the claim and abstract is to facilitate accurate translation for foreign languages.

The invention, therefore, encompasses a method of preparing a patent application with a computer characterized by performing the following steps.

The first step is the storing 10 of a document template in a computer program which contains the headings recited above and used in this application.

The second step is the storing of a page break in the computer program before the CLAIMS heading.

The third step is the storing of a page break in the computer program before the heading ABSTRACT OF THE DISCLOSURE.

The fourth step is the storing a footer in the computer program for displaying the attorney file identification on every page of the application, preferably in the lower left hand corner.

The fifth step is the storing of a Figure paragraph in the computer program immediately after the heading BRIEF DESCRIPTION OF THE DRAWINGS.

The sixth step is the storing a terminal paragraph in the computer program stating it is to be understood that reference numerals in the claims are merely for convenience and are not to be in any way limiting immediately before the page break before the heading CLAIMS.

After all of the proceeding steps are complete, the seventh step is the drafting or creating in the computer of an independent claim beginning with the words characterized by and ending in a clause reciting and isolating the patentable novelty and preceded by at least one clause reciting prior art elements only to the extent necessary to support and provide antecedent basis for the recitations in the characterized by clause. This independent claim is stored in the program and is absent of any reference numerals.

The next or eight step is the drafting of dependent claims al of which are ultimately dependent upon the independent claim for successively more specifically defining the patentable novelty. Certainly, the first dependent claim two should further define the novelty set forth in the characterized by clause of the independent claim and such novelty should be more successively defined in subsequent dependent claims, adding that which is old to the extent necessary to support further definition of the novelty.

After all of the claims have been drafted, the ninth step is the storing 12 of a duplicate of the independent claim in the computer program followed by retrieving and presenting the stored independent claim under the heading SUMMARY OF THE INVENTION AND ADVANTAGES. This ninth step includes the automatic editing of the duplicate independent claim copied under the heading SUMMARY OF THE INVENTION AND ADVANTAGES into grammatically correct sentence structure including changing the word "said" to—the—and adding verbs. This should be without adding further description whereby the SUMMARY OF THE INVENTION AND ADVANTAGES is commensurate in scope to the independent claim. This is important because in some countries the paragraph summarizing the invention must not be any more narrow than the broadest independent claim to prevent the broadest independent claim from being interpreted in the same scope as the summary of the invention.

The tenth step is then the storing 14 a duplicate set of all of the claims in the computer program, and retrieving and presenting the duplicate set of claims under the heading DESCRIPTION OF THE PREFERRED EMBODIMENT. This basic step must be performed only after all of the claims have finalized in order to make certain that the description uses exactly the same terminology as the claims, and vice versa. Of course, an essential eleventh step is the searching for each occurrence of the word "said" in the duplicate set of claims copied into the specification, programming the computer program to replace the word "said" with the word—the—in the duplicate set of claims copied into the specification, and editing the duplicate set of claims copied into the specification into grammatically correct sentence structure including adding verbs. All of these automatic corrections can be changed manually by the operator. The step of interspersing alternative phrasing of several of the edited clauses of the duplicate set of claims is usually included. Sometimes claim language can be cumbersome and alternative names and phrases ca be clarifying and can provide alternative claim language for the examiner. Of course, the order of presentation of the claims in the duplicate set of claims can be rearranged in the description for the most logical and/or fluid presentation. e.g., changing the order of apparatus and method or bringing up every further definition of an element in juxtaposition to the first mention of the element.

The twelfth step is the storing 16 of the element names in the computer program. of the elements in the order recited in the duplicate set of claims. This step includes storing 18 in the computer program successive even numbers beginning with a number above the highest Figure number to identify the respective element names. As stated above and by example, if the highest number used to identify a Figure in the drawings is between ten and nineteen, then the first number used for a reference numeral would be twenty, i.e., the next number ending in zero. This step also includes searching 20 in the computer program for each occurrence of each respective element name in the order of occurrence in the duplicate set of claims (now the description) and replacing each respective element name with that respective element name followed by successive ones of the even numbers to provide identifying reference numerals for the element names in the order of occurrence in the duplicate set of claims. It is important that the reference numeral be automatically added to any addition of the element name in subsequent editing. In other words, the elements are assigned reference numerals in the order of appearance or presentation in the description whereby the reference numerals are first presented in numerical order. In a more specific sense, the method includes the increments of storing of the element name of the first element recited in the duplicate set of claims and shown in the drawings, storing the first element name followed by a first selected even number above the highest numeral used to identify a Figure in the drawings, searching for each occurrence of the first element name and replacing same with the first element name followed by the selected even number to provide a first identifying reference numeral for the first element name. This is then followed by storing the element name of the second element recited in the duplicate set of claims, which is shown in the drawings, storing the second element name followed by the next even number following the reference numeral used to identify the first element name, searching for each occurrence of the second element name and replacing same with the second element name followed by said next even number to provide a second identifying reference numeral for the second element name. This sequence is repeated until all of the elements recited in the description and shown in the drawings are provided reference numerals.

A thirteenth step is the adding of each reference numeral to every showing of the element in the drawings, which can be performed at any convenient juncture but is preferably performed immediately in response to that element being assigned a reference numeral. It is important that the reference numeral be applied to every showing of an element in the drawings and not in just one Figure. Conversely, it is important to verify that each line in the drawing is clearly described in the specification.

After the description is in final form, the fourteenth step is the selecting and storing 22 in the computer program of abstract sentences, including the reference numerals, from under the heading DESCRIPTION OF THE PREFERRED EMBODIMENT which most succinctly and specifically describe the elements shown in the drawings. These sentences are accumulated in order of presentation and are selected so that the a description of the elements in the characterized by clause is commensurate with the specificity recited in dependent claims. Again, since the abstract is to be more specific and avoid broad claim language, it should include the specificity usually set forth in dependent claims. These sentences are retried the heading ABSTRACT OF THE DISCLOSURE.

The fifteenth step is the storing 24 in the computer program each reference numeral recited in the CLAIMS and in the ABSTRACT OF THE DISCLOSURE within parenthesis ( ), searching in the computer program and replacing each such reference numeral in the CLAIMS and in the ABSTRACT OF THE DISCLOSURE with the corresponding stored reference number within parentheses ( ). Preferably, all of the numerals and parenthesis when used should be in bold type.

A sixteenth step is the drafting of a second paragraph under the heading SUMMARY OF THE INVENTION AND ADVANTAGES reciting the advantages of the patentable novelty set forth in the characterized by clause.

The method includes finishing steps which may be performed is any order. One is the drafting of a sentence under the Technical Field heading stating the art to which the invention contributes. Another is the step of drafting a description of the specific state of the prior art under the heading Prior Art ending with the problem which the characterized by clause solves. The most pertinent and best prior art found in the novelty search should be recited under this heading, i.e., the prior art patents round which the claims were drafted, but not necessarily all of the patents noted in the novelty search. After the problem or void in the prior art has been framed at the end of the prior art section, a second paragraph should be drafted under the heading SUMMARY OF THE INVENTION AND ADVANTAGES reciting the advantages of the patentable novelty set forth in the characterized by clause, i.e., the void in the prior art filled by the invention. The advantages, of course, are the mirror or are the results of the solution to the problem provided by the invention, as summarized in the immediately preceding paragraph. In some cases, it will be necessary to add a heading RELATED APPLICATION and drafting a paragraph identifying a related application. This paragraph can be embedded into the template memory and edited or deleted depending upon the status of the application being prepared. It is also necessary to draft a subparagraph for each Figure of the drawings under the heading BRIEF DESCRIPTION OF THE DRAWINGS to identify the type of view and what is shown.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of preparing a patent application with a computer comprising the steps of:

storing a document template in a computer program which contains headings equivalent to:

---

"BACKGROUND OF THE INVENTION
1) Field of the Invention
2) Description of the Prior Art
SUMMARY OF THE INVENTION AND ADVANTAGES
BRIEF DESCRIPTION OF THE DRAWINGS
DETAILED DESCRIPTION OF THE PREFERRED EMBODIMENT
CLAIMS
ABSTRACT OF THE DISCLOSURE";

--- storing a page break immediately before the "CLAIMS" heading in the computer program;

storing a page break immediately before the "ABSTRACT OF THE DISCLOSURE" heading in the computer program;

storing a footer in the computer program for displaying the attorney file identification on every page of the application;

composing by a user an independent claim in the computer program ending in a clause beginning with the words "characterized by" and reciting and isolating the [patentable] novelty and preceded by at least one clause reciting prior art elements to the extent necessary to support and provide antecedent basis for the "characterized by" clause;

drafting claims in the computer ultimately dependent upon the independent claim for successively more specifically defining the patentable novelty; and characterized by storing a duplicate set of all of the claims in the computer program, and creating the description by retrieving the duplicate set of claims under the heading "DESCRIPTION OF THE PREFERRED EMBODIMENT", searching for each occurrence of the word "said" in the duplicate set of claims copied into the specification, programming the computer program to replace the word "said" with the word "the" in the duplicate set of claims copied into the specification, and editing the duplicate set of claims copied into the specification into grammatically correct sentence structure including adding verbs, and assigning reference numerals for the first time by the steps of storing the element names of the elements in the order recited in the duplicate set of claims, storing successive numbers beginning with a number above the highest Figure number to identify the respective element names, and searching for each occurrence of each respective element name in the order of occurrence in the duplicate set of claims, replacing each respective element name with that respective element name followed by successive ones of said numbers to provide identifying reference numerals for the element names in the order of occurrence in the duplicate set of claims and automatically shifting the reference numerals in response to changing the order of occurrence in the duplicate set of claims.

2. The method as set forth in claim 1 including the steps of storing a duplicate of the independent claim in the computer program, retrieving the duplicate independent claim under the heading "SUMMARY OF THE INVENTION AND ADVANTAGES", and editing the duplicate independent claim copied under the heading "SUMMARY OF THE INVENTION AND ADVANTAGES" into grammatically correct sentence structure including changing "said" to "the" and adding verbs without adding further description whereby the "SUMMARY OF THE INVENTION AND ADVANTAGES" is commensurate in scope to the independent claim.

3. The method as set forth in claim 1 including the step of storing each reference numeral recited in the "CLAIMS" and in the "ABSTRACT OF THE DISCLOSURE" within parenthesis "( )", searching and replacing each such reference number in the "CLAIMS" and in the "ABSTRACT OF THE DISCLOSURE" with the corresponding stored reference number within parentheses "( )".

4. A method of preparing a patent application with a computer characterized by performing the following steps:
storing a document template in a computer program which contains headings equivalent to,

---

"BACKGROUND OF THE INVENTION
1) Field of the Invention
2) Description of the Prior Art
SUMMARY OF THE INVENTION AND ADVANTAGES
BRIEF DESCRIPTION OF THE DRAWINGS
DETAILED DESCRIPTION OF THE PREFERRED EMBODIMENT
CLAIMS
ABSTRACT OF THE DISCLOSURE";

--- storing a page break in the computer program immediately before the "CLAIMS" heading;
storing a page break in the computer program immediately before the heading

---

"ABSTRACT OF THE DISCLOSURE";

--- storing a footer in the computer program for displaying the attorney file identification on every page of the application;
storing a Figure paragraph in the computer program immediately after the heading "BRIEF DESCRIPTION OF THE DRAWINGS";
storing a terminal paragraph in the computer program stating it is to be understood that reference numerals in the claims are merely for convenience and are not to be in any way limiting immediately before the page break before the heading "CLAIMS";
composing by a user an independent claim in the computer program beginning with the words "characterized by" and ending in a clause reciting and isolating the [patentable] novelty and preceded by at least one clause reciting prior art elements only to the extent necessary to support and provide antecedent basis for the recitations in the "characterized by" clause;
composing by a user claims in the computer program ultimately dependent upon the independent claim for successively more specifically defining the [patentable] novelty;
storing a duplicate of the independent claim in the computer program,
retrieving the stored independent claim under the heading "SUMMARY OF THE INVENTION AND ADVANTAGES", and editing the duplicate independent claim copied under the heading "SUMMARY OF THE INVENTION AND ADVANTAGES" into grammatically correct sentence structure including changing the word "said" to "the" and adding verbs without adding further description whereby the "SUMMARY OF THE INVENTION AND ADVANTAGES" is commensurate in scope to the independent claim;
storing a duplicate set of all of the claims in the computer program, and creating the description by retrieving the duplicate set of claims under the heading "DESCRIPTION OF THE PREFERRED EMBODIMENT";
searching for each occurrence of the word "said" in the duplicate set of claims copied into the specification, programming the computer program to replace the word "said" with the word "the" in the duplicate set of claims copied into the specification, and editing the duplicate set of claims copied into the specification into grammatically correct sentence structure including adding verbs;
storing the element names in the computer program of the elements in the order recited in the duplicate set of claims, storing in the computer program successive even numbers beginning with a number above the highest Figure number to identify the respective element names, and searching in the computer program for each occurrence of each respective element name in the order of occurrence in the duplicate set of claims and replacing each respective element name with that respective element name followed by successive ones of the even numbers to provide for the first time identifying reference numerals for the element names in the order of occurrence in the duplicate set of claims and automatically shifting the reference numerals in response to changing the order of occurrence in the duplicate set of claims;
adding each reference numeral to every showing of the element in the drawings;
selecting and storing in the computer program abstract sentences including reference numbers from under the heading "DESCRIPTION OF THE PREFERRED EMBODIMENT" which most succinctly and specifically describe the elements shown in the drawings with a description of the elements in the "characterized by" clause commensurate with the specificity recited in dependent claims, and retrieving the abstract sentences under the heading "ABSTRACT OF THE DISCLOSURE"; and
storing in the computer program each reference numeral recited in the "CLAIMS" and in the "ABSTRACT OF THE DISCLOSURE" within parenthesis "( )", searching in the computer program and replacing each such reference numeral in the "CLAIMS" and in the "ABSTRACT OF THE DISCLOSURE" with the corresponding stored reference number within parentheses "( )".

5. A computer program and a computer comprising:
a template memory containing a document template containing headings equivalent to, "BACKGROUND OF THE INVENTION
1) Field of the Invention
2) Description of the Prior Art
SUMMARY OF THE INVENTION AND ADVANTAGES
BRIEF DESCRIPTION OF THE DRAWINGS
DETAILED DESCRIPTION OF THE PREFERRED EMBODIMENT
CLAIMS
ABSTRACT OF THE DISCLOSURE";

a page break immediately before said heading "CLAIMS" in the computer program; and a page break separating said heading "ABSTRACT OF THE DISCLOSURE" from the remainder of said headings in the computer program; and a footer for displaying the attorney file identification in the margin of every page of the application; and the text, "Other advantages of the present invention will be readily appreciated as the same becomes better understood by reference to the following detailed description when considered in connection with the accompanying drawings wherein:

FIG. 4 is; and

FIG. 5 is"

immediately after the heading "BRIEF DESCRIPTION OF THE DRAWINGS";

the text,

"The invention has been described in an illustrative manner, and it is to be understood that the terminology which has been used is intended to be in the nature of words of description rather than of limitation Obviously, many modifications and variations of the present invention are possible in light of the above teachings It is, therefore, to be understood that within the scope of the appended claims, wherein reference numerals are merely for convenience and are not to be in any way limiting, the invention may be practiced otherwise than as specifically described"

before said page break preceding the heading "CLAIMS";

and characterized by an independent claim processor for duplicating and storing an independent claim under the heading "SUMMARY OF THE INVENTION AND ADVANTAGES" and for editing the duplicated independent claim copied under the heading "SUMMARY OF THE INVENTION AND ADVANTAGES" into grammatically correct sentence structure including changing "said" to "the" and adding verbs whereby the recitation under the heading "SUMMARY OF THE INVENTION AND ADVANTAGES" is commensurate in scope to said independent claim;

a multiple claim processor for duplicating and storing all of the claims under said heading "DESCRIPTION OF THE PREFERRED EMBODIMENT" for creating the description and for searching and replacing each occurrence of the word "said" in said duplicate set of claims copied under the heading "DESCRIPTION OF THE PREFERRED EMBODIMENT" with the word "the", and for editing said duplicate set of claims into grammatically correct sentence structure;

a reference number memory for storing successive even numbers beginning with the number ten;

a Figure number memory for receiving and storing the highest Figure number used to identify Figures of the drawings;

a reference number processor responsive to said Figure number memory for storing the element names of the elements in the order recited in said duplicate set of claims and for searching and replacing each occurrence of each respective element name in the order of occurrence in said duplicate set of claims with said respective element name followed by successive ones of said even numbers beginning with the first number ending in zero following the highest Figure number to provide for the first time identifying reference numerals for said element names in the order of occurrence in said duplicate set of claims and automatically shifting the reference numerals in response to changing the order of occurrence in the duplicate set of claims;

an abstract processor for selecting and storing abstract sentences including said reference numerals from under said heading "DESCRIPTION OF THE PREFERRED EMBODIMENT" and duplicating said abstract sentences under said heading "ABSTRACT OF THE DISCLOSURE"; and a parenthesis processor for automatically enclosing each reference numeral within parentheses in said claims and in said "ABSTRACT OF THE DISCLOSURE".

6. A method of preparing a patent application with a computer comprising the steps of:

storing a document template in a computer program which contains headings equivalent to:

SUMMARY OF THE INVENTION
DETAILED DESCRIPTION
CLAIMS
ABSTRACT drafting claims for specifically defining the novelty; and characterized by duplicating at least one of the claims under the DESCRIPTION heading to make sure the description as created in the first instance uses the exact same terminology as used in the claims, editing the duplicate claim copied under the DESCRIPTION heading into grammatically correct sentence structure, storing the element name of the first element recited in the duplicate claim copied and edited under the DESCRIPTION heading and shown in the drawings with a first in a series of reference numerals, searching for each occurrence of the first element name and replacing same with the first element name followed by the first reference numeral to provide a first identifying reference numeral for the first element name, storing the element name of the second element recited secondedly in the duplicate claim copied and edited under the DESCRIPTION heading and shown in the drawings with the next sequential number in the series following the reference numeral used to identify the first element name, searching for each occurrence of the second element name and replacing same with the second element name followed by the next number to provide a second identifying reference numeral for the second element name, automatically shifting the reference numerals in response to changing the order of occurrence of the element names in the duplicate claim copied under the DESCRIPTION heading so that the elements are numbered in order of being first recited under the DESCRIPTION heading, and automatically shifting the reference numerals in response to interleaving an additional element into the duplicate claim copied under the DESCRIPTION heading for changing the order of occurrence of the elements names in the duplicate claim copied under the DESCRIPTION heading so that all numbered elements are numbered in order of being first recited under the DESCRIPTION heading.

7. The method as set forth in claim 6 including drafting the broadest independent claim ending in a novelty clause reciting and isolating the novelty and preceded by at least one clause reciting prior art elements to the extent necessary to support and provide antecedent basis for the novelty clause, storing a duplicate of the novelty clause in the computer program, retrieving the duplicate novelty clause under the heading SUMMARY OF THE INVENTION, and editing the duplicate novelty clause copied under the heading SUMMARY OF THE INVENTION into grammatically correct sentence whereby the SUMMARY OF THE INVENTION is commensurate in scope to the novelty clause in the broadest independent claim.

8. The method as set forth in claim 6 wherein the step of storing the element name of the first element recited in the duplicate claim copied and edited under the DESCRIPTION heading and shown in the drawings is further defined as using a first in the series of reference numerals that is above the highest numeral used to identify a Figure in the drawings.

9. The method as set forth in claim 6 including drafting an abstract under the ABSTRACT heading, and searching for each occurrence of each element name and replacing same with the respective element name followed by the assigned reference numeral to provide a reference numeral with the occurrence of each element name recited under the DESCRIPTION and CLAIMS and ABSTRACT headings.

10. The method as set forth in claim 9 including automatically adding parenthesis ( ) about each reference numeral recited in the CLAIMS and ABSTRACT headings.

11. A computer program and a computer comprising:

a template memory containing a document template containing the headings equivalent to:

---
SUMMARY OF THE INVENTION
DETAILED DESCRIPTION
CLAIMS
ABSTRACT
--- an independent claim processor for drafting claims specifically defining the novelty and for duplicating at least one of the claims under the DESCRIPTION heading to make sure the description uses the exact same terminology as the claims as created in the first instance and for editing said duplicate claim into grammatically correct sentence structure;

a reference number memory for storing the element name of the first element recited in the duplicate claim copied and edited under the DESCRIPTION heading and shown in the drawings with a first reference numeral in a series of reference numerals and for searching for each occurrence of the first element name and replacing same with the first element name followed by the first reference numeral to provide a first identifying reference numeral for the first element name and for storing the element name of the second element recited next in the duplicate claim copied and edited under the DESCRIPTION heading and shown in the drawings with the next sequential reference numeral in the series following the first reference numeral and for searching for each occurrence of the second element name and replacing same with the second element name followed by the next reference numeral to provide a second identifying reference numeral for the second element name and for automatically shifting the reference numerals in response to changing the order of occurrence of the element names in the duplicate claim copied and edited under the DESCRIPTION heading so that the elements are numbered in order of being first recited under the DESCRIPTION heading and for automatically shifting the reference numerals in response to interleaving an additional element name into the duplicate claim copied under the DESCRIPTION heading for changing the order of occurrence of the element names in the duplicate claim copied and edited under the DESCRIPTION heading so that all numbered element names are numbered in the sequential order of being first recited under the DESCRIPTION heading.

12. A computer program and a computer as set forth in claim 11 including a Figure number memory for receiving and storing the highest Figure number used to identify Figures of the drawings, said reference number processor being responsive to said Figure number memory for replacing the occurrence of the first recited element name in said duplicate claim with said respective element name followed by the first number ending in zero following the highest Figure number to provide identifying reference numerals for said element names in the order of occurrence in said duplicate claim under the DESCRIPTION heading to avoid duplicating a Figure number as a reference numeral.

13. A computer program and a computer as set forth in claim 11 including a subprocessor for automatically searching for each occurrence of each element name and replacing same with the respective element name followed by the assigned reference numeral with the occurrence of each element name recited under the CLAIMS and ABSTRACT headings along with adding reference numerals to the element names recited under the DESCRIPTION heading.

\* \* \* \* \*

UNITED STATES PATENT AND TRADEMARK OFFICE
CERTIFICATE OF CORRECTION

| | | |
|---|---|---|
| PATENT NO. | : 7,890,851 B1 | |
| APPLICATION NO. | : 09/273021 | |
| DATED | : February 15, 2011 | |
| INVENTOR(S) | : Harold W. Milton, Jr. | |

It is certified that error appears in the above-identified patent and that said Letters Patent is hereby corrected as shown below:

Column 1, line 10: "acceptble" should read -- acceptable --;
Column 1, line 16: "prepartion" should read -- preparation --;
Column 1, line 18: "consistentcy" should read -- consistency --;
Column 1, line 19: "terminalogy" should read -- terminology --;
Column 1, line 20: "Accorndingly" should read -- Accordingly --;
Column 1, line 21: "prepaing" should read -- preparing --;
Column 5, line 38: "After all of the proceeding" should read -- After all of the preceding --;
Column 5, line 47: "al of which" should read -- all of which --;
Column 6, line 25: "ca be clarifying" should read -- can be clarifying --; and
Column 12, line 56: "secondedly in the" should read -- secondly in the --.

Signed and Sealed this
Twenty-sixth Day of April, 2011

David J. Kappos
*Director of the United States Patent and Trademark Office*